March 22, 1938.                J. SCHULMAN                2,111,814
BUMPER
Filed July 6, 1936
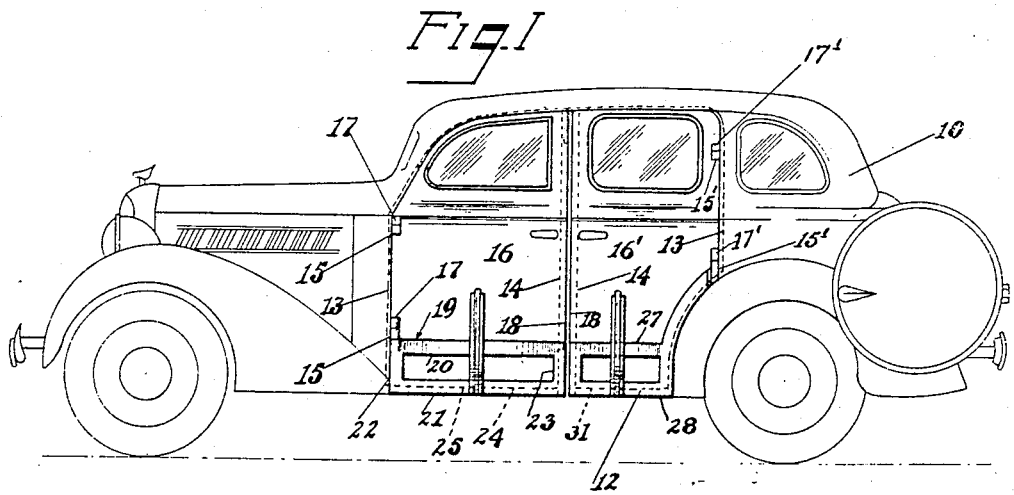
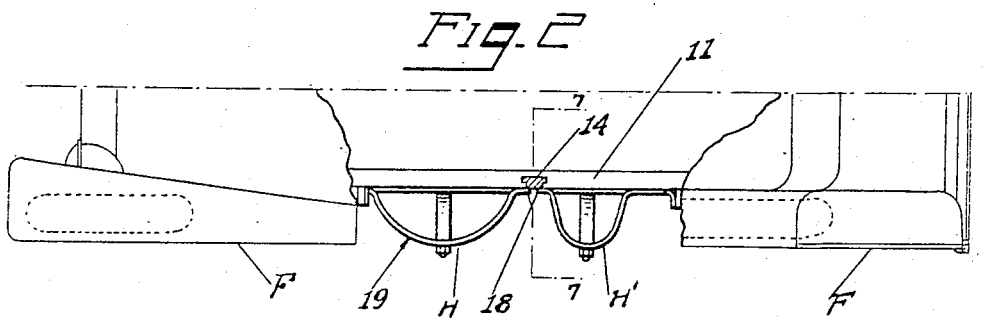
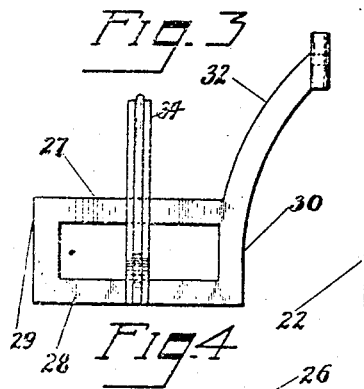
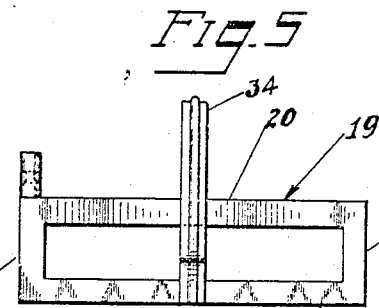
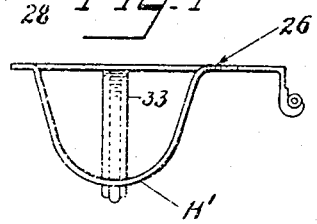
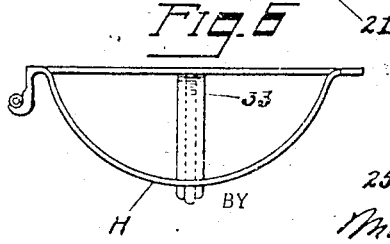
INVENTOR.
JOSEPH SCHULMAN
Maxwell E. Sparrow
ATTORNEY.

Patented Mar. 22, 1938

2,111,814

UNITED STATES PATENT OFFICE 2,111,814

BUMPER

Joseph Schulman, Brooklyn, N. Y.

Application July 6, 1936, Serial No. 89,020

14 Claims. (Cl. 293—57)

This invention relates generally to improvements in bumpers for motor vehicles and more particularly to bumpers for association with the sides of the motor vehicle.

It is customary to provide bumpers at the front and at the rear of a motor vehicle. Also bumper devices have been applied to the sides of a motor vehicle to protect the body from side collisions. Bumpers for this purpose are described in my patents, Numbers 1,708,804 and 1,801,289, dated respectively, April 9, 1929 and April 21, 1931. These devices, however, although not complicated comprise a plurality of movable parts which require assembling. This invention contemplates simplifying side bumper structure.

It is an object of this invention to provide economic, efficient and practical side bumpers for motor vehicles movable with the doors of the vehicle, and comprising relatively few parts and which will adequately protect the passenger-carrying part of the vehicle against injury resulting from collisions and the like.

A further object of the invention resides in the provision of a side bumper which may be made integral with the door of a motor vehicle to protect the body of the vehicle against collision.

A further object of the invention resides in providing a motor vehicle door with bumper means capable of withstanding shock and impact resulting from collision thereby permitting the door proper to be made of a lighter construction.

A further object of the invention resides in the provision of a side bumper adapted for association and arrangement with respect to the body and chassis of a vehicle whereby the forces of impact due to collision are transferred or transmitted and distributed from the bumper to the frame and chassis.

Motor vehicles have "turned over" as a result of being struck on a side by an oncoming vehicle.

It is a further object of the invention to provide a side bumper which will prevent the "turning-over" of the vehicle, this being accomplished by transferring the blow from the bumper to the chassis or steel frame of the vehicle.

These several advantageous objects are attained by the novel design, construction and arrangement of parts, as hereinafter described and illustrated in the accompanying drawing, constituting a feature of this disclosure, and in which:

Fig. 1 illustrates a side elevation of a motor vehicle showing in dark lines side bumpers and bumper guards embodying the invention.

Fig. 2 is a plan view of same with top and doors removed to show the relation of bumpers to vehicle proper.

Fig. 3 is a front elevational view of a bumper and bumper guard applied to the rear door of a motor vehicle.

Fig. 4 is a plan view of Fig. 3.

Fig. 5 is a front elevational view of a bumper and bumper guard applied to the front door of a motor vehicle.

Fig. 6 is a plan view of Fig. 5.

Fig. 7 is a sectional view taken along line 7—7 of Fig. 2 and showing one of the bumpers in side elevation.

In the drawing the numeral 10 represents a body of a motor vehicle mounted on a chassis 11. Body 10 is provided with conventional steel frame-work 12, surrounding the door openings.

The frame-work 12 includes the vertical side members 13 and intermediate vertical member 14. The side members 13 have the stationary door hinge ears 15, 15' and the doors 16, 16' are provided with the hinge ears 17, 17' complementary to ears 15, 15', by which the doors are swingably mounted on frame-work 12 in the conventional manner. The free edges 18 of the doors abut against member 14 when the doors are in closed position.

Bumper 19 which is carried by a front door 16 of the vehicle may comprise substantially horizontal members 20, 21 joined by the vertical members 22, 23 forming an integral unit. Member 20 is outwardly bowed or arcuated as clearly shown in Figs. 2 and 6 and member 21 follows the contour of the bottom edge of door 16 and is adapted to lie flat thereagainst but has its lower edge 24 projecting below the bottom edge of the door as shown in dotted lines in Fig. 1. Lower edge 24 is adapted to abut against the outer surface of the horizontal chassis member 25 when the door is in closed position. The high point H of the arcuate member 20 is in substantial alinement with the outward edges of the vehicle fenders F.

Bumper 26 which is carried by a rear door 16' of the vehicle may comprise substantially horizontal members 27, 28 joined by the vertical members 29, 30 forming an integral unit.

Member 27 is outwardly bowed or arcuated as clearly shown in Figs. 2 and 4 and member 28 follows the contour of the bottom edge of door 16' and is adapted to lie flat thereagainst but has its lower edge 31 projecting below the bottom edge of the door as clearly shown in Fig. 7. The same applies with reference to the bottom edge of bumper 19 as hereinabove stated. Lower edge 31 is adapted to abut against the outer surface of the horizontal chassis member 25 when the door is in closed position. The high point H' of the arcuate member 27 is in substantial alinement with the outward edges of the vehicle fenders F. Bumper 26 may be provided with the upward extending arm 32 conforming in contour to the rear lower edge of the door.

The bumpers 19, 26 may be secured to the respective doors in any suitable manner. The bumper may be secured to or made an integral part of the door 16 or 16' and swinging part 17 or 17' of the hinge or either the door or the swinging part of the hinge. Each bumper may be provided with a bumper guard having the bottom angular part 33 and vertical extension 34.

The bumpers are so designed and arranged with respect to the doors, body, frame-work and chassis that any impact due to an external force or obstruction will be taken up by the bumpers and transmitted to the frame-work and/or chassis.

Although I have described my improvements with considerable detail and with respect to a certain particular form of my invention, I do not desire to be limited to such details since many changes and modifications may well be made without departing from the spirit and scope of my invention in its broadest aspect.

Having thus described the invention, what is claimed as new and desired to secure by Letters Patent, is:—

1. A bumper having a hinged part and swingable with a door of a vehicle, said bumper extending above the bottom of the door to protect the same against impact.

2. A bumper including a part of a hinge of a vehicle door and swingable with said door, said bumper extending above the bottom of the door to protect the same against impact.

3. The combination of a swinging door and bumper having a common hinge, and a bumper guard connected to said bumper.

4. A bumper attached to and swingable with a door of a vehicle, said bumper having a portion adapted to abut against the vehicle chassis whereby impact received by the bumper is transmitted to the chassis.

5. A bumper attached to and swingable with a door of a vehicle, said bumper having a portion adapted for abutment against the body frame of a vehicle, whereby blows received by the bumper are transmitted to the said frame.

6. A bumper attached to and swingable with a door of a vehicle, said bumper having parts adapted for abutment against the body frame and chassis of the vehicle, whereby blows received by the bumper are transmitted to the said frame and chassis.

7. A device comprising a combined bumper and bumper guard attached to and swingable with a door of a vehicle, said device having a portion adapted for abutment against the body frame and chassis of the vehicle, whereby blows received by the device are transmitted to the said frame and chassis.

8. A device comprising a combined bumper and bumper guard attached to and swingable with a door of a vehicle, said device having a portion adapted for abutment against the body frame of the vehicle, whereby blows received by the device are transmitted to the said frame.

9. A device comprising a combined bumper and bumper guard attached to and swingable with a door of a vehicle, said device having a portion adapted for abutment against the chassis of the vehicle, whereby blows received by the device are transmitted to the said chassis.

10. A bumper swingable with a door of a vehicle, said bumper having a substantially horizontal arcuate portion and another portion substantially conforming to the bottom margin of the door, said last-mentioned portion being adapted for abutment against the chassis of the vehicle whereby blows imparted to the bumper are transmitted to the said chassis.

11. A bumper swingable with a door of a vehicle, said bumper having a substantially horizontal arcuate portion and another portion substantially conforming to the bottom margin of the door, said last-mentioned portion being adapted for abutment against the chassis of the vehicle whereby blows imparted to the bumper are transmitted to the said chassis, said bumper having a portion adapted for abutment against the body frame of the vehicle for a similar purpose.

12. A bumper hingedly attached to a vehicle and swingable with a door of said vehicle, said bumper having a portion adapted to abut against the vehicle chassis whereby impact received by the bumper is transmitted to the chassis.

13. A bumper hingedly attached to a vehicle and swingable with a door of said vehicle, said bumper having a portion adapted for abutment against the body frame of the vehicle, whereby blows received by the bumper are transmitted to the said frame.

14. A bumper hingedly attached to a vehicle and swingable with a door of said vehicle, said bumper having parts adapted for abutment against the body frame and chassis of the vehicle, whereby blows received by the bumper are transmitted to the said frame and chassis.

JOSEPH SCHULMAN.